Jan. 6, 1959 — L. D. STATHAM — 2,867,115
MEANS FOR EXTENDING RANGE OF TRANSDUCERS
Filed May 11, 1953

INVENTOR.
LOUIS D. STATHAM
BY
ATTORNEY.

United States Patent Office 2,867,115
Patented Jan. 6, 1959

2,867,115

MEANS FOR EXTENDING RANGE OF TRANSDUCERS

Louis D. Statham, Beverly Hills, Calif., assignor to Statham Instruments, Inc., Los Angeles, Calif., a corporation of California Application May 11, 1953, Serial No. 354,195

5 Claims. (Cl. 73—398)

This invention relates to transducers, and particularly to adapters to alter the stiffness, that is, the spring rate of a transducer.

As is well known, transducers are composed of two relatively movable members the separation of which is altered by a force or motion to be sensed, and the variation in separation is a measure of the force or motion.

In the usual transducer the movable member or members are mounted for motion on flexible supports. The natural frequency of such units depends not only on the mass of the movable member, but also on the degree of flexibility of the spring suspension. The degree of displacement of the movable member upon application of the force or motion to be sensed also depends upon the degree of stiffness, i. e., flexibility of the spring suspension. Thus, when the transducer is built the mass of the movable members and the spring rate of the flexible members are designed for the range of motion and force to be sensed and for the frequencies of the force or motion application to be endured by the unit. However, this imposes a limitation upon the instrument to the conditions set in the original design.

I have devised an adapter whereby the stiffness of the transducer may be increased, thereby increasing the natural frequency of the device and reducing the displacement of the movable member on application of the force or motion in the range set in the original design, and also permitting an application of a greater force to the unit than would be permissible in the original design, thus increasing the range of the magnitude of the forces or motions which the transducer may usefully sense.

I accomplish this improvement by adding an adapter to a transducer in which the movable members are connected to a flexible diaphragm or bellows. The adapter consists of a second diaphragm or bellows with a motion-transmitting connection between the original diaphragm or bellows of the transducer. The second diaphragm is made stiffer than the first diaphragm. The motion or force to be sensed is applied to the second diaphragm and transmitted to the first diaphragm.

These and other objects of my invention will be further described by reference to the drawing, in which Fig. 1 is a vertical section of one form of a transducer including the improvements of my invention, with parts in elevation;

Figure 1:
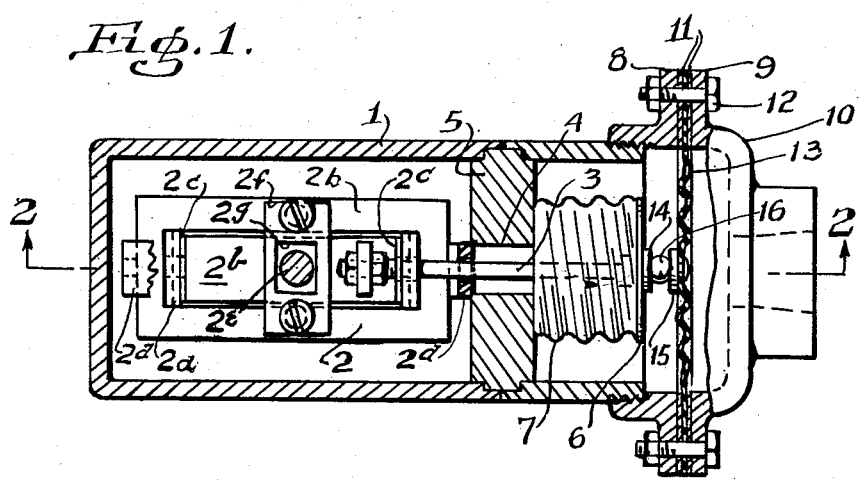
Figure 2:
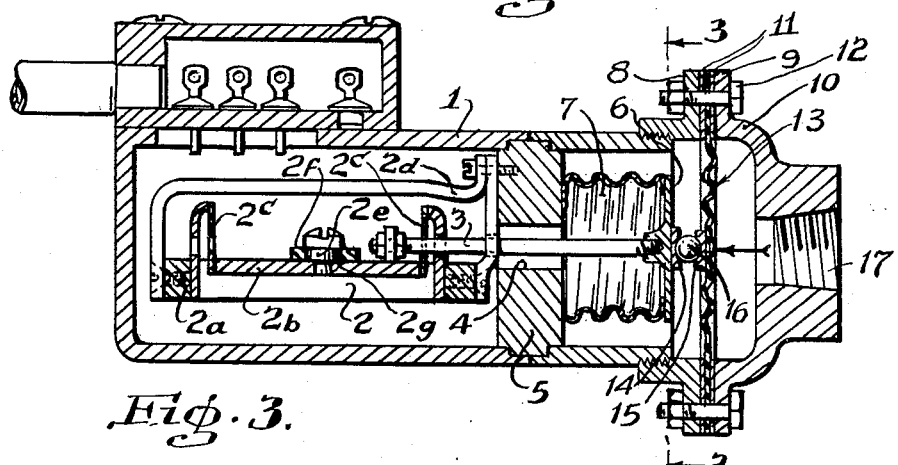
Fig. 2 is a section taken on line 2—2 of Fig. 1.
Figure 3:
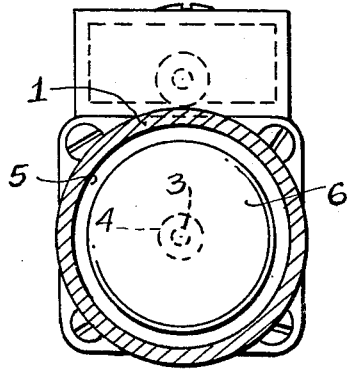
Fig. 3 is a section taken on line 3—3 of Fig. 2.

In case 1 is mounted a transducer 2. Any form of transducer may be used, for example, a mechanical or an optical type or electrical type, depending upon change in capacity, inductance, or resistance, may be employed. In all such devices there is a movable element the displacement of which produces an effect capable of measurement. A specific example, given by way of illustration only, is the one illustrated in the figures of the strain gage described in the Statham Patent No. 2,573,286, to which reference may be made for further description. The pins and strain wires have been omitted from the drawings for simplicity.

The movable member 2b is suspended on flat springs 2c on the frame 2a mounted on suitable brackets 2d in case 1. Since, as in all types of transducers, the motion of the movable members must be limited so that injury to the transducer is avoided by excessive displacement, a motion limit stop is provided. A bar 2f mounted on the frame 2a is provided with a slot 2g. The stud 2e is mounted in the movable member 2b. The motion of the movable member 2b is thus limited to the clearance of the stud in the slot.

The rod 3 connected to the movable member 2b passes through a bore 4 in wall 5 and is connected to plate 6 of the bellows 7 mounted on wall 5 over the bore 4. The diaphragm 13 is clamped in an adapter between the flange 8 threadably engaged to teh end of the case 1, and the flange 9 of the cap 10 of the adapter by means of bolts 12 and suitably sealed by the gaskets 11. Elements 8, 9 and 10 thus form the adapter of my device, which can be opened by removal of bolts 10. Centrally mounted on the opposing faces of the diaphragm 13 and the plate 6 are bosses 14 and 15 between which is placed a ball 16 in contact with the opposing faces of the bosses. The ball is not rigidly connected to the bosses 14 and 15 and thus any non-parallel displacement of the diaphragm 13 and plate 6 will not introduce any twist in the bellows.

Figure 4:
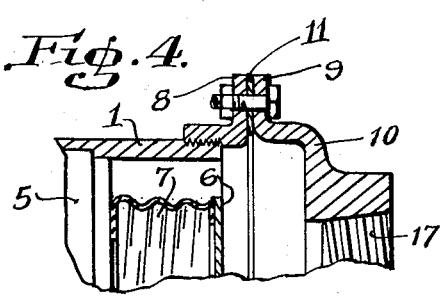
Fig. 4 shows a partial sectional view of the device of Fig. 1, with certain parts removed.

By removing the diaphragm 13 and the ball 16, the cap 10 may be mounted directly on the flange 8, as shown in Fig. 4. It will be seen that when pressure is exerted through the port 17 (in form Fig. 4) the deflection of the movable member and the resultant variation in resistance of the strain wires will depend upon the stiffness of the bellows 7 and of the springs 2c. These, also, will determine the natural frequency of the system. The range of pressure capable of being sensed by the transducer is thus dependent upon the stiffness of the system.

The movable member is thus mounted on a flexible support (i. e., the springs 2c and the bellows 7) of determined stiffness, depending upon the design characteristics of the springs 2c and the bellows. Usually the bellows is stiffer than the springs 2c and the spring rate of the bellows 7 determines, for all practical purposes, the stiffness of the mounting of the movable member 2b. It will be observed that instead of a bellows I may use its equivalent, a diaphragm mounted over the bore 4. For simplicity the bellows will also be termed a flexible diaphragm, since the plate 6 is flexibly mounted on the bellows.

With the diaphragm 13 in place, assuming that the diaphragm is stiffer than the bellows 7, the stiffness of the system will depend upon the stiffness of 13. Thus, when pressure is introduced through 17 it will deflect the diaphragm 13 and the motion of the diaphragm 13 is transmitted via the ball 16 to the plate 6 and bellows 7.

It will thus be seen that by making the diaphragm 13 stiffer than the bellows 7, the pressure necessary to cause any degree of motion of the movable member 2b will be greater than that which will cause the same motion in the form of Fig. 4. The natural frequency of the system will also be greater because of the increase in stiffness of the system. However, for any degree of stiffness the natural frequency may be adjusted by varying the mass of the diaphragm 13 and the ball 16.

While I have described a particular embodiment of my invention for the purpose of illustration, it should be understood that various modifications and adaptations thereof may be made within the spirit of the invention as set forth in the appended claims.

I claim:

1. A transducer comprising a case, a motion sensing device mounted in said case, a first flexible diaphragm mounted in said case, a motion-transmitting connection between said diaphragm and said motion sensing device, a removable adapter, means for mounting said adapter on said case, a second diaphragm removably mounted in said adapter, and a removable universal motion-transmitting connection between said diaphragms, the second mentioned connection preventing twist in said first diaphragm due to any non-parallel displacement of said second diaphragm; whereby, when said adapter, second diaphragm, and second mentioned connection are assembled with said case, a force applied to said second diaphragm is transmitted to said sensing device.

2. A transducer comprising a case, a motion sensing device mounted in said case, a first flexible diaphragm mounted in said case, a motion-transmitting connection between said diaphragm and said motion sensing device, a removable adapter, a second diaphragm mounted in said adapter, said second diaphragm being stiffer than said first-mentioned diaphragm, and a removable universal motion-transmitting connection between said diaphragms, the second mentioned connection preventing twist in said first diaphragm due to any non-parallel displacement of said second diaphragm; whereby, when said adapter, second diaphragm, and second mentioned connection are assembled with said case, a force applied to said second diaphragm is transmitted to said sensing device.

3. A transducer comprising a case, a motion sensing device mounted in said case, a diaphragm mounted in said case, a motion-transmitting connection between said diaphragm and said motion sensing device, an adapter mounted on said case, a diaphragm removably mounted in said adapter and spaced from said first-mentioned diaphragm and parallel to said first-mentioned diaphragm, and a ball frictionally positioned between said diaphragms; whereby a force applied to said second diaphragm is transmitted to said sensing device.

4. A transducer comprising a case, a motion sensing device mounted in said case, a diaphragm mounted in said case, a motion-transmitting connection between said diaphragm and said motion sensing device, an adapter mounted on said case, a diaphragm removably mounted in said adapter and spaced from said first-mentioned diaphragm and parallel to said first-mentioned diaphragm, said second diaphragm being stiffer than said first-mentioned diaphragm, and a ball frictionally positioned between said diaphragms, said diaphragms being substantially undeflected in their initial position; whereby a force applied to said second diaphragm is transmitted to said sensing device.

5. A transducer comprising a case, an electrical resistance strain wire motion sensing device mounted in said case, a diaphragm mounted in said case, a motion transmitting connection between said diaphragm and said motion sensing device, an adapter mounted on said case, a diaphragm removably mounted in said adapter and spaced from said first mentioned diaphragm and parallel to said first mentioned diaphragm, said second diaphragm being stiffer than said first mentioned diaphragm, and a ball frictionally positioned between said diaphragms, said diaphragms being substantially undeflected in their initial position; whereby a force applied to said second diaphragm is transmitted to said sensing device.

References Cited in the file of this patent

UNITED STATES PATENTS

| | | |
|---|---|---|
| 16,458 | Allcroft et al. | Jan. 27, 1857 |
| 1,406,616 | Cutts et al. | Feb. 14, 1922 |
| 1,528,627 | Peters | Mar. 3, 1925 |
| 2,220,651 | Hoffmann et al. | Nov. 5, 1940 |
| 2,260,837 | Kuehni | Oct. 28, 1941 |
| 2,319,011 | Meredith | May 11, 1943 |
| 2,573,286 | Statham et al. | Oct. 30, 1951 |
| 2,600,271 | Schaevitz | June 10, 1952 |

FOREIGN PATENTS

| | | |
|---|---|---|
| 573,453 | France | Mar. 12, 1924 |
| 925,062 | France | Mar. 24, 1947 |